(12) United States Patent
Balbi

(10) Patent No.: US 7,975,832 B2
(45) Date of Patent: Jul. 12, 2011

(54) TRANSFER ASSEMBLY FOR TRANSFERRING GLASS ARTICLES

(75) Inventor: Mario Balbi, Cuneo (IT)

(73) Assignee: Bottero S.p.A., Cuneo (IT)

( * ) Notice: Subject to any disclaimer, the term of this patent is extended or adjusted under 35 U.S.C. 154(b) by 273 days.

(21) Appl. No.: 12/384,913

(22) Filed: Apr. 10, 2009

(65) Prior Publication Data

US 2009/0257856 A1 Oct. 15, 2009

(30) Foreign Application Priority Data

Apr. 11, 2008 (IT) .............................. TO2008A0278

(51) Int. Cl.
*B65G 37/00* (2006.01)
(52) U.S. Cl. .................. 198/598; 198/418.6; 198/478.1; 198/723
(58) Field of Classification Search ............... 198/418.6, 198/377.02, 598, 478, 723; 414/917
See application file for complete search history.

(56) References Cited

U.S. PATENT DOCUMENTS

| | | | | | |
|---|---|---|---|---|---|
| 3,026,988 | A | * | 3/1962 | Fisk | 198/411 |
| 4,295,559 | A | * | 10/1981 | Neal et al. | 198/598 |
| 4,441,604 | A | * | 4/1984 | Schlig et al. | 198/598 |
| 4,711,345 | A | * | 12/1987 | Fukuda et al. | 198/572 |
| 5,158,423 | A | * | 10/1992 | Liljengren et al. | 198/750.11 |
| 6,220,422 | B1 | * | 4/2001 | Lee | 198/370.07 |
| 6,726,001 | B2 | * | 4/2004 | Wild et al. | 198/433 |
| 6,854,588 | B1 | * | 2/2005 | Blattner et al. | 198/468.8 |
| 7,040,852 | B2 | * | 5/2006 | Mori et al. | 414/744.5 |
| 7,185,751 | B2 | * | 3/2007 | Guidetti | 198/418.6 |
| 7,374,033 | B2 | * | 5/2008 | Monti | 198/432 |
| 7,398,885 | B2 | * | 7/2008 | Heuft et al. | 209/651 |
| 7,621,712 | B2 | * | 11/2009 | Simmons | 414/793.9 |
| 7,686,564 | B2 | * | 3/2010 | Kaiser et al. | 414/791.6 |

\* cited by examiner

*Primary Examiner* — Douglas A Hess
(74) *Attorney, Agent, or Firm* — Ohlandt, Greeley, Ruggiero & Perle, L.L.P.

(57) ABSTRACT

A transfer assembly for transferring glass articles from a supporting surface onto an unloading conveyor, wherein a pickup member, for engaging the articles for transfer, is hinged to one end of a first powered actuating rod, and is connected to one end of a second powered actuating rod movable independently of the first powered actuating rod to adjust the angular position of the pickup member about a movable hinge axis as the pickup member rotates between a pickup position and a release position in which the articles are released onto the unloading conveyor.

9 Claims, 4 Drawing Sheets

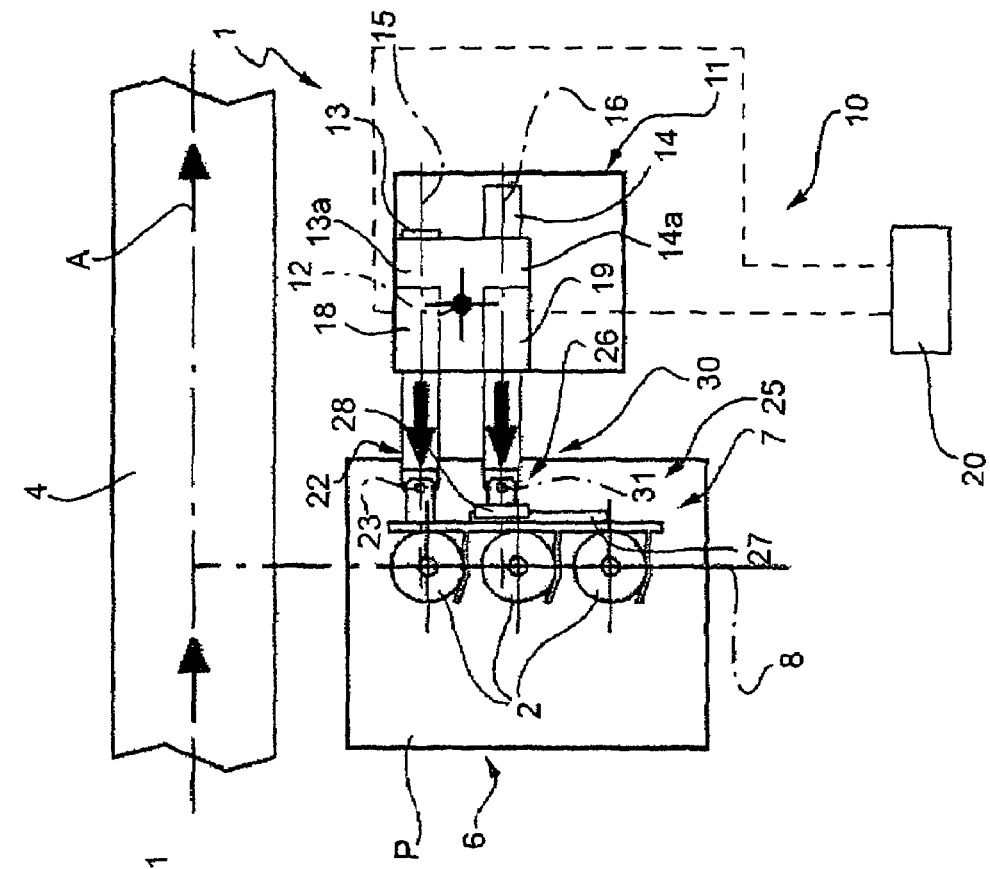
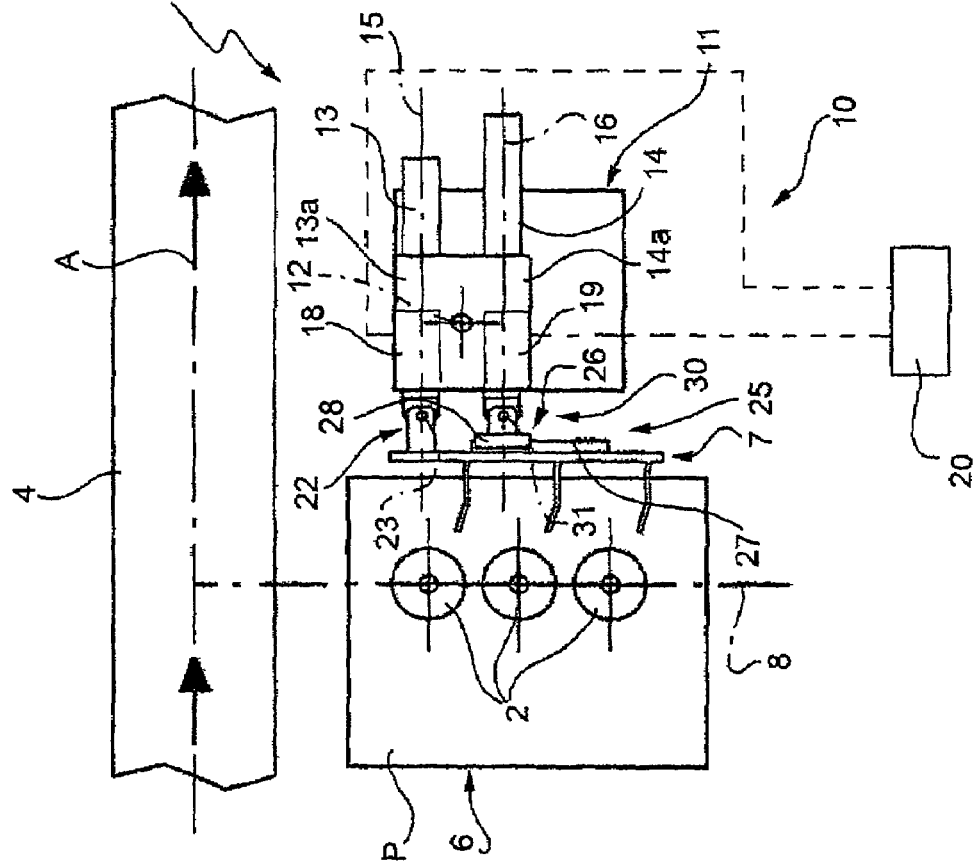

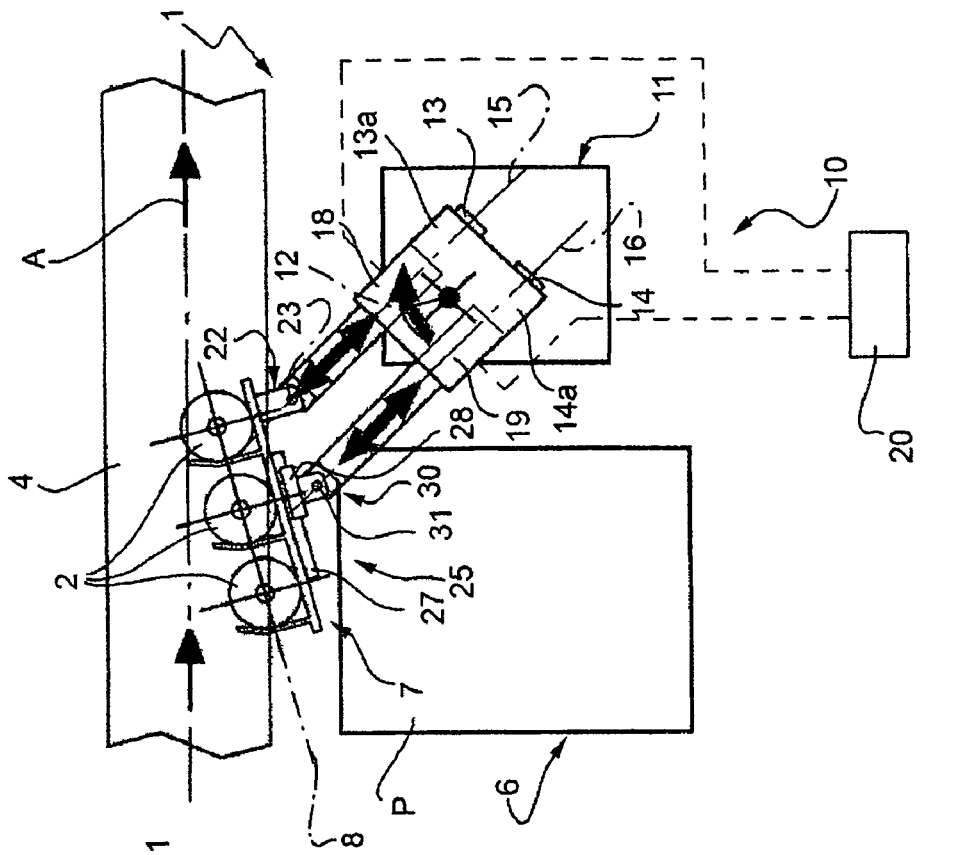
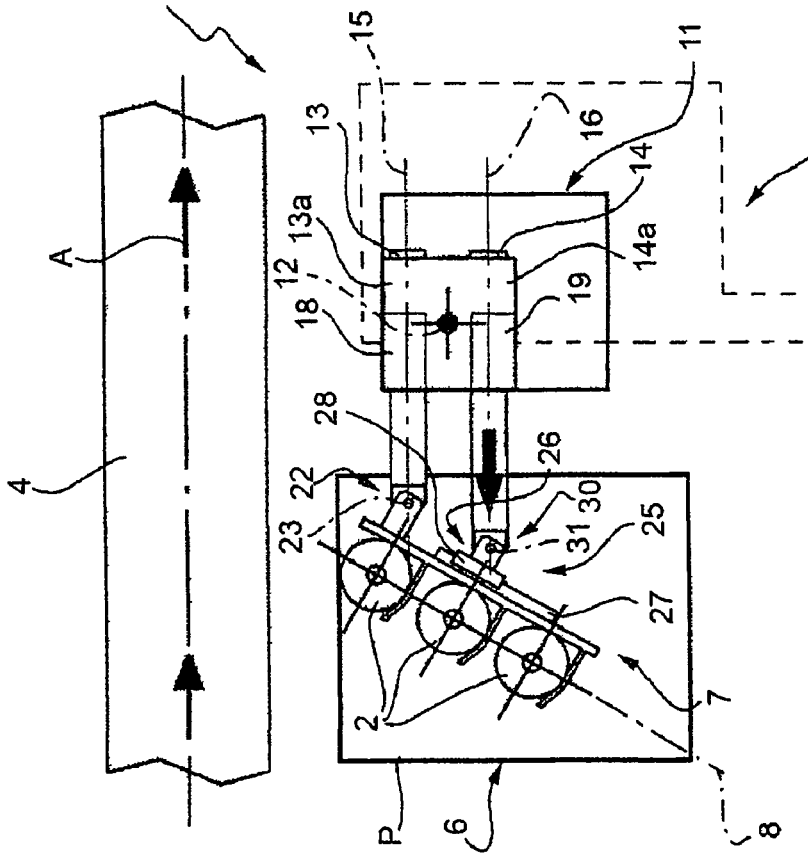
FIG. 1c
FIG. 1d

TRANSFER ASSEMBLY FOR TRANSFERRING GLASS ARTICLES

CROSS REFERENCE TO RELATED APPLICATIONS

This application claims benefit under 35 U.S.C. §119(a) of Italian Patent Application No. TO2008A 000278 filed Apr. 11, 2008, the entire contents of which are incorporated herein by reference.

BACKGROUND OF THE INVENTION

1. Field of the Invention

The present invention relates to a transfer assembly for transferring glass articles.

2. Description of Related Art

As is known, hollow glass articles are formed in molds, each comprising two half-molds movable between a closed molding position, and an open position to remove the formed glass article from the mold. From the molds, the glass articles are placed on top of a supporting surface, from which they are subsequently transferred onto a linear conveyor which feeds them successively to the output of the system.

The glass articles are transferred from the supporting surface to the linear conveyor by a transfer assembly, which moves them along a substantially 90° arc, and comprises a pickup member for engaging one or more articles to be transferred; a movable supporting arm fitted integrally with the pickup member; a pneumatic linear actuator for moving the supporting arm and the pickup member horizontally to and from the glass articles; and a rotary actuator for rotating the supporting arm, about a fixed vertical hinge axis, between a pickup position to remove the articles off the supporting surface, and an unloading position to deposit the articles onto the linear conveyor.

With the increase in the output rate of molding systems, known transfer assemblies of the above type have proved increasingly inefficient and unreliable. This is mainly due to the pickup member being connected integrally to the supporting arm, which makes it extremely difficult to set and make fast corrections to the pickup positions and the unloading positions onto the conveyor, and, above all, makes it difficult to feed the articles along predetermined paths without the articles being spun off the pickup member by centrifugal force, which inevitably increases as the output rate gets faster, due to the rotation speed of the arm about the hinge axis.

SUMMARY OF THE INVENTION

It is an object of the present invention to provide a transfer assembly, for transferring glass articles, designed to provide a straightforward, low-cost solution to the above drawbacks, and which at the same time is compact and cheap and easy to produce.

According to the present invention, there is provided a transfer assembly for transferring glass articles from a supporting surface onto an unloading conveyor, the assembly comprising a fixed support; a pickup and transfer member for engaging the articles for transfer; a powered first actuating member connected to said fixed support to rotate in opposite directions about a substantially vertical fixed hinge axis; a first rod connected to said first actuating member to move in a first direction substantially perpendicular to said fixed hinge axis; and first actuating means for moving said first rod in said first direction; the assembly being characterized by also comprising first hinge means for connecting said first rod to said pickup member in rotary manner about a first movable hinge axis parallel to said fixed hinge axis; a second actuating member carried by said first actuating member; a second rod connected to said second actuating member to move in a second direction substantially perpendicular to said fixed hinge axis; reciprocal displacement means interposed between said second rod and at least one of said pickup member and said first actuating member; and second actuating means, independent of said first actuating means, to move said second rod with respect to said second actuating member in a direction substantially perpendicular to said fixed hinge axis and independently of said first rod.

BRIEF DESCRIPTION OF THE DRAWINGS

A non-limiting embodiment of the invention will be described by way of example with reference to the accompanying drawings, in which:

FIGS. 1a-1f show, schematically, a preferred embodiment of the transfer assembly according to the present invention in different operating positions;

DETAILED DESCRIPTION OF THE INVENTION

Figure 1E:
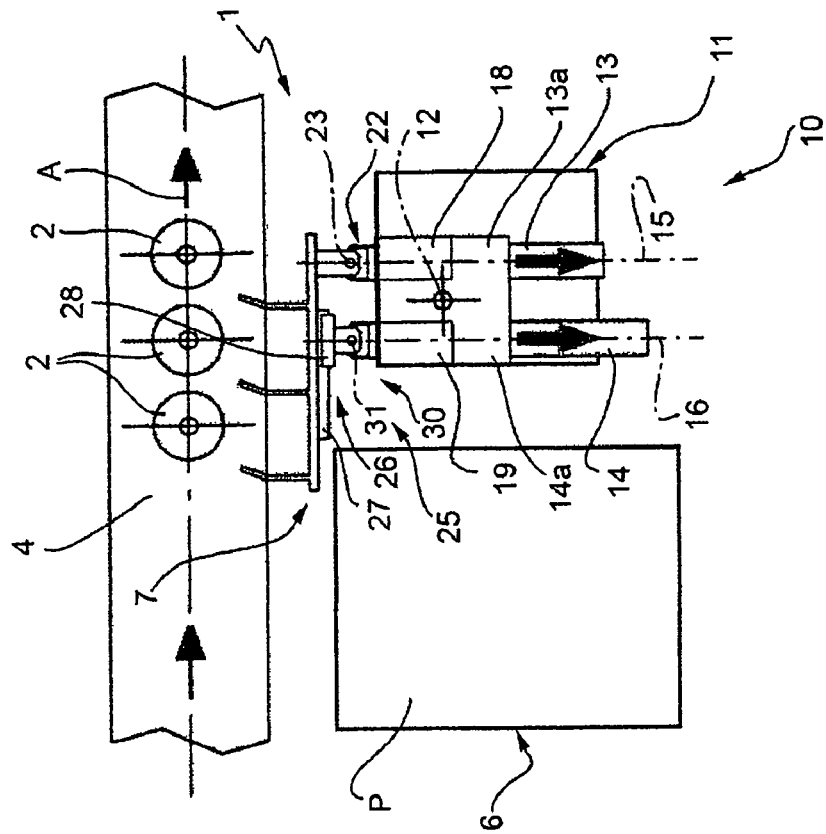
Figure 1F:
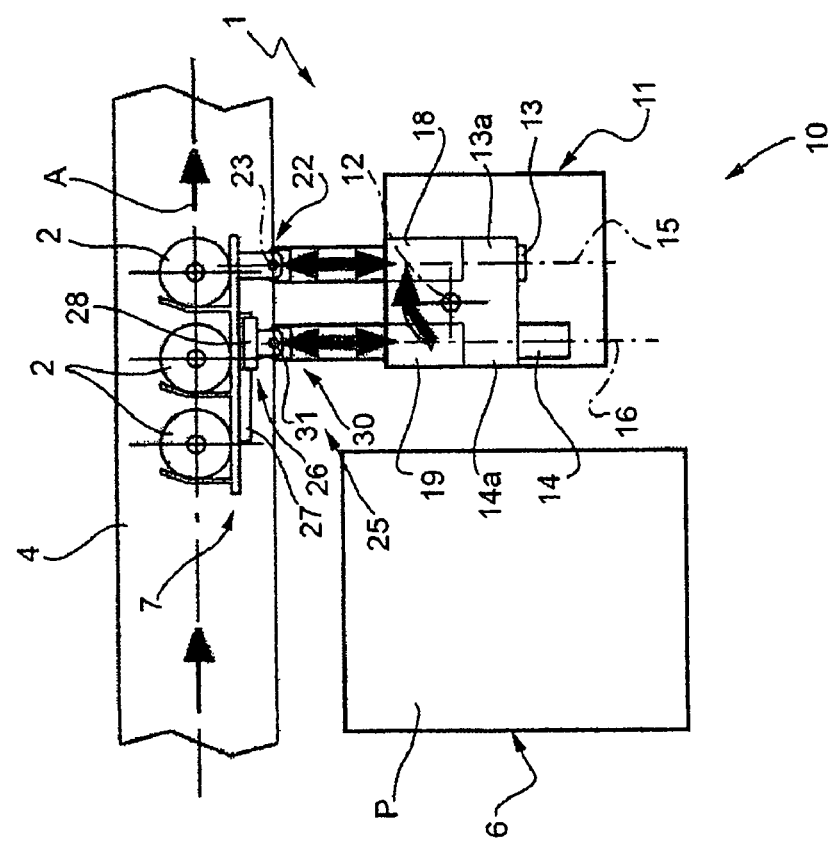

Number 1 in FIGS. 1a-1f indicates as a whole a transfer assembly for transferring glass articles 2 from a fixed supporting surface P onto a belt conveyor 4, which feeds articles 2 in a direction A to an output of the article 2 molding system (not shown).

Transfer assembly 1 comprises a fixed supporting frame 6 extending beneath supporting surface P; a known pickup and transfer member 7 for engaging the articles 2 for transfer, and which, in the example described, transfers three side by side articles 2 aligned in a direction 8; and an actuating device 10 for operating pickup member 7.

Device 10 comprises an actuating member 11 (shown schematically) connected to fixed frame 6 in axially fixed manner to rotate about a substantially vertical fixed hinge axis 12, and powered in known manner to rotate substantially 90° in opposite directions.

As shown in FIG. 1, device 10 also comprises two parallel, side by side rods 13, 14, which are connected to respective stably connected portions 13a, 14a of actuating member 11, and are moved in respective parallel, substantially horizontal directions 15, 16 by respective known, e.g. linear, actuating assemblies 18, 19 (shown schematically) independent of each other and controlled by a control unit 20 of device 10.

As shown in FIG. 1, rod 13 is hinged to pickup member 7 by a hinge 22 having a movable hinge axis 23 parallel to fixed axis 12; and rod 14 is connected to member 7 by a reciprocal displacement assembly 25. Reciprocal displacement assembly 25 comprises a guide-slide assembly 26, a guide 27 of which is fitted stably to pickup member 7 in a direction parallel to the alignment direction 8 of articles 2 for transfer, and a slide 28 of which is fitted in axially sliding manner to guide 27, and is hinged to rod 14 by a hinge 30 having a movable hinge axis 31 parallel to axes 12 and 23.

Figure 2B:
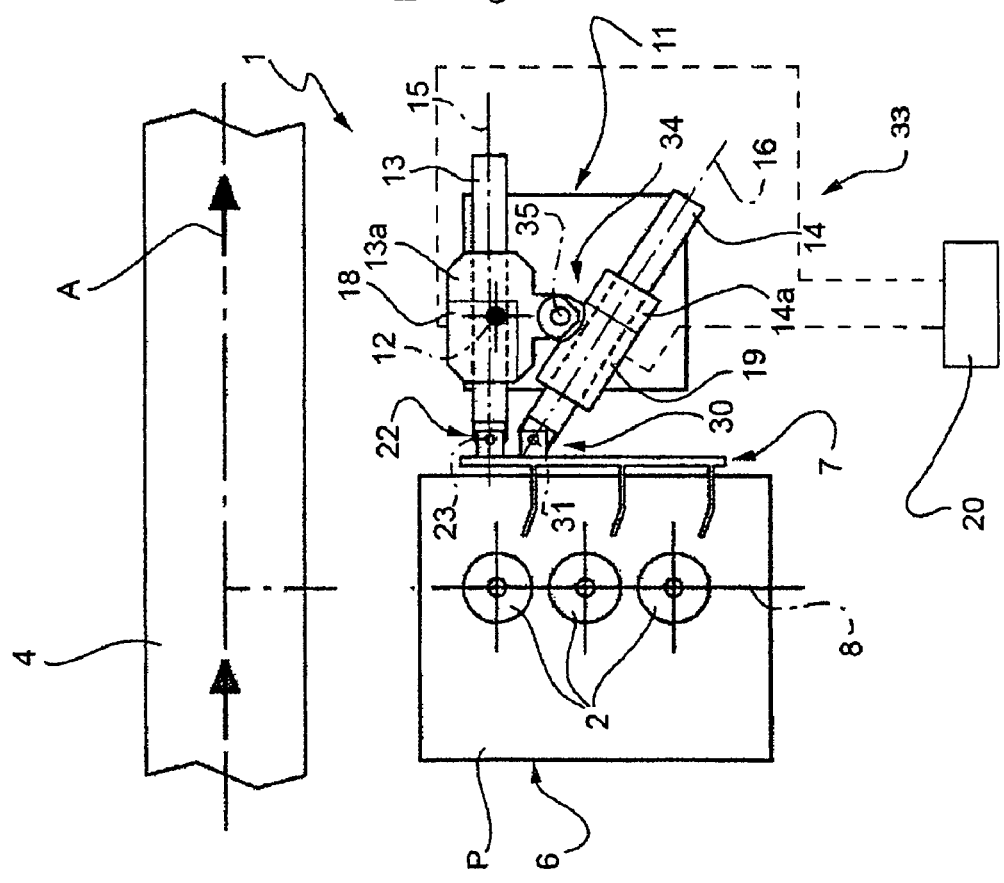
FIGS. 2a, 2b are similar to FIGS. 1a, 1e, and show, schematically, a variation of a detail in the FIG. 1 assembly.
Figure 2A:
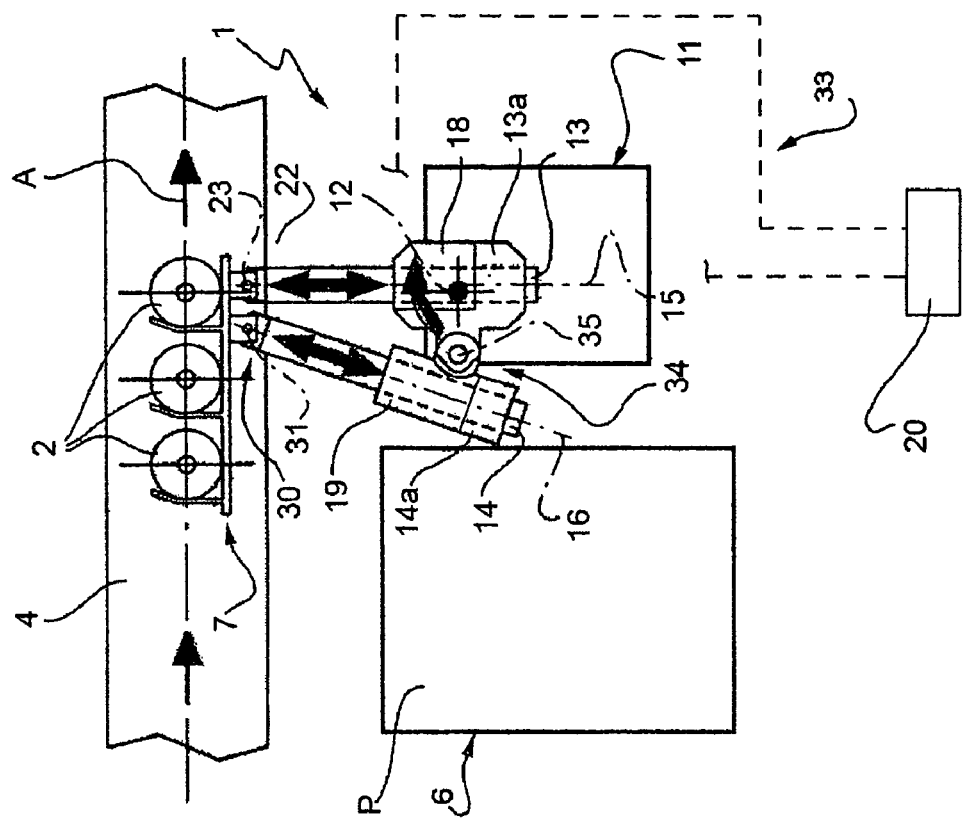

The FIG. 2a, 2b variation shows a device 33, which differs from device 10 by the two portions 13a, 14a of the actuating member being connected by a hinge 34 having a movable hinge axis 35 parallel to and eccentric with respect to axis 12, and by hinge 30 connecting rod 14 directly to pickup member 7. Consequently, as portion 13a rotates about fixed hinge axis 12, the rods, and therefore the sliding directions of the rods, form varying angles.

In actual use, by activating either or both of actuating assemblies 18 and 19, pickup member 7 can be moved from a rest position (shown in FIGS. 1*a* and 2*a*) to and from a pickup position (shown in FIG. 1*b*), and from a release position (shown in FIGS. 1*e* and 2*b*) back into the rest position. Given the way in which rods 13 and 14 are connected to each other and to pickup member 7, and the fact that rods 13 and 14 can be operated independently, the angular position of pickup member 7 about axis 23 can be varied continuously, regardless of the angular position of portions 13*a* and 14*a* about fixed axis 12. Each of articles 2 aligned on supporting surface P can thus be moved and accompanied along a respective optimum transfer path to balance or eliminate the centrifugal components, and so increase transfer speed and, hence, the output rate of the system.

By accompanying articles 2 as described during transfer, the auxiliary, e.g. pneumatic, retaining devices of known pickup and transfer members can be eliminated, thus simplifying and reducing the cost of currently used transfer assemblies.

Clearly, changes may be made to assembly 1 as described herein without, however, departing from the protective scope as defined in the accompanying Claims.

The invention claimed is:

1. A transfer assembly for transferring glass articles (2) from a supporting surface onto an unloading conveyor, the assembly comprising a fixed support (6); a pickup and transfer member for engaging the articles for transfer; a powered first actuating member connected to said fixed support to rotate in opposite directions about a substantially vertical fixed hinge axis; a first rod connected to said first actuating member to move in a first direction substantially perpendicular to said fixed hinge axis; and first actuating means for moving said first rod in said first direction; the assembly being characterized by also comprising first hinge means for connecting said first rod to said pickup member in rotary manner about a first movable hinge axis parallel to said fixed hinge axis; a second actuating member carried by said first actuating member; a second rod connected to said second actuating member to move in a second direction substantially perpendicular to said fixed hinge axis; reciprocal displacement means interposed between said second rod and at least one of said pickup member and said first actuating member; and second actuating means, independent of said first actuating means, to move said second rod with respect to said second actuating member in a direction substantially perpendicular to said fixed hinge axis and independently of said first rod.

2. An assembly as claimed in claim 1, characterized in that said first and second actuating members are connected integrally to each other; and in that said reciprocal displacement means are interposed solely between said second rod and said pickup member.

3. An assembly as claimed in claim 2, characterized in that said first and second direction of said first and second rods are substantially parallel.

4. An assembly as claimed in claim 2, characterized in that said reciprocal displacement means comprise a guide-slide assembly; and second hinge means for connecting said second rod to said guide-slide assembly in rotary manner about a second movable hinge axis parallel to said first movable hinge axis.

5. An assembly as claimed in claim 4, characterized in that said guide-slide assembly comprises a guide fitted to said pickup member; and a slide connected to said second hinge means.

6. An assembly as claimed in claim 5, characterized in that said guide is straight and extends in a direction parallel to a direction in which said articles for transfer are aligned on said supporting surface.

7. An assembly as claimed in claim 1, characterized in that said reciprocal displacement means comprise further hinge means interposed between said first and second actuating member to permit relative rotation of said first and second actuating member with respect to each other about a further movable hinge axis parallel to said fixed hinge axis; and second hinge means for connecting said second rod directly to said pickup member, to permit relative rotation of said second rod with respect to said pickup member about a second movable hinge axis parallel to said first movable hinge axis.

8. An assembly as claimed in claim 7, characterized in that said further movable hinge axis is eccentric with respect to said fixed hinge axis.

9. An assembly as claimed in claim 7, characterized in that said first and second direction of said first and second rod form a variable angle as said first actuating member rotates about said fixed hinge axis.

* * * * *